US012393019B2

(12) United States Patent
Hwang et al.

(10) Patent No.: US 12,393,019 B2
(45) Date of Patent: Aug. 19, 2025

(54) LASER SCANNER

(71) Applicant: ELECTRONICS AND TELECOMMUNICATIONS RESEARCH INSTITUTE, Daejeon (KR)

(72) Inventors: Jung Hwan Hwang, Daejeon (KR); Jong Hwa Kwon, Daejeon (KR); Chang Hee Hyoung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 443 days.

(21) Appl. No.: 18/151,027

(22) Filed: Jan. 6, 2023

(65) Prior Publication Data

US 2024/0134185 A1 Apr. 25, 2024
US 2024/0231079 A9 Jul. 11, 2024

(30) Foreign Application Priority Data

Oct. 25, 2022 (KR) .................. 10-2022-0138174

(51) Int. Cl.
*G02B 26/08* (2006.01)
*G02B 26/10* (2006.01)

(52) U.S. Cl.
CPC ................. *G02B 26/105* (2013.01)

(58) Field of Classification Search
CPC .... G02B 26/105; G02B 26/10; G02B 26/101; G02B 1/10; G02B 5/08; G02B 7/1821; G02B 26/0825; G01S 7/4816
See application file for complete search history.

(56) References Cited

U.S. PATENT DOCUMENTS

| 2016/0313553 | A1 | 10/2016 | Song et al. |
| 2017/0066193 | A1 | 3/2017 | Kim et al. |
| 2017/0322075 | A1* | 11/2017 | Lorenzoni ............. G01J 1/0414 |
| 2020/0275078 | A1 | 8/2020 | Pau |

FOREIGN PATENT DOCUMENTS

| JP | 5672221 B2 | 2/2015 |
| KR | 10-1189168 B1 | 10/2012 |
| KR | 10-2019-0123826 A | 11/2019 |
| KR | 20200102899 A | 9/2020 |
| KR | 10-2022-0013059 A | 2/2022 |

* cited by examiner

*Primary Examiner* — Euncha P Cherry
(74) *Attorney, Agent, or Firm* — Rabin & Berdo, P.C.

(57) ABSTRACT

Provided is a laser scanner. The laser scanner includes a laser transmitter configured to output a laser radiated towards an object, a laser receiver configured to receive a laser reflected from the object, and an oscillating mirror of which a mirror surface is coated with a thin metal film to reflect the received laser reflected from the object and be penetrated by an electromagnetic wave incident from an outside the laser scanner. The received laser reflected from the object is reflected by the mirror surface of the oscillating mirror coated with the thin metal film and received by a laser receiver, and the electromagnetic wave incident from the outside the laser scanner penetrates the mirror surface of the oscillating mirror and then dissipates.

9 Claims, 4 Drawing Sheets

LASER SCANNER

CROSS-REFERENCE TO RELATED APPLICATION

This application claims the benefit of Korean Patent Application No. 10-2022-0138174 filed on Oct. 25, 2022, in the Korean Intellectual Property Office, the entire disclosure of which is incorporated herein by reference for all purposes.

BACKGROUND

1. Field of the Invention

One or more embodiments relate to a laser scanner, and more specifically, to a structure of an oscillating mirror capable of eliminating an impact of an electromagnetic wave incident from outside the laser scanner.

2. Description of the Related Art

A laser receiver configuring a laser scanner generally uses a photodiode (PD). A PD is a semiconductor element including a PN junction. A PN junction is a junction formed by a p-type semiconductor and an n-type semiconductor contacting each other. More specifically, in a PD, a hole of the p-type semiconductor is diffused to an n-type semiconductor at a PN junction area, an electron of the n-type semiconductor is diffused to the p-type semiconductor, and then a built-in voltage is formed at a boundary surface of the two semiconductors.

Here, when a laser received by the laser receiver is input to the PN junction of the PD, the built-in voltage decreases due to thermal energy of the laser and current flows in the PN junction. A laser receiver may receive a laser by detecting such a current.

In contrary, a decrease in built-in voltage of a PN junction and a following flow of current also occur due to an electromagnetic wave incident on a laser scanner from outside the laser scanner. When an electromagnetic wave is input through an aperture of a laser scanner, the electromagnetic wave, same as the laser received from outside the laser scanner, is reflected by an oscillating mirror. The reflected electromagnetic wave, same as the received laser, is input to a laser receiver to reduce the built-in voltage of the PN junction.

Such a decrease in built-in voltage of a PN junction and a flow of current due to an electromagnetic wave cause malfunctioning of a laser scanner, and a possibility of such malfunctioning of a laser scanner due to an electromagnetic wave may further increase as mobile communication services evolve. In particular, an energy density of electromagnetic waves increases as a beamforming electromagnetic wave is used in 5G mobile communication services, and an electromagnetic wave with such a high energy density may be incident on a laser scanner to rapidly reduce a built-in voltage, causing frequent malfunctioning of the laser scanner.

SUMMARY

Embodiments provide a method of preventing a malfunctioning of a laser scanner due to an external electromagnetic wave, by using an oscillating mirror of which a mirror surface is coated with a thin metal film to reflect a transceived laser and be penetrated by the electromagnetic wave incident from outside the laser scanner.

According to an aspect, there is provided a laser scanner including a laser transmitter configured to output a laser radiated towards an object, a laser receiver configured to receive a laser reflected from the object, and an oscillating mirror of which a mirror surface is coated with a thin metal film to reflect the received laser reflected from the object and be penetrated by an electromagnetic wave incident from an outside the laser scanner. The received laser reflected from the object may be reflected by the mirror surface of the oscillating mirror coated with the thin metal film and received by a laser receiver, and the electromagnetic wave incident from the outside the laser scanner may penetrate the mirror surface of the oscillating mirror and then dissipate.

A thickness of the thin metal film coated on the mirror surface of the oscillating mirror may be determined based on a skin depth defined by using a conductivity and a permeability of a metal used for a coating and a frequency of a wave.

The thickness of the thin metal film may be determined to be greater than a skin depth defined based on a laser transceived in the laser scanner and less than a skin depth defined based on the electromagnetic wave incident from the outside the laser scanner.

A mirror surface coated with a thin metal film may be formed on a diagonal surface of a cylindrical pillar cut in a diagonal direction and a supporter may be disposed at a lower end of the mirror surface and configured to support the mirror surface coated with the thin metal film, in the oscillating mirror.

An electromagnetic wave absorber may be disposed on a vertical plane of the cylindrical pillar in the oscillating mirror.

According to an aspect, there is provided a laser scanner including an oscillating mirror configured to enable a scanning of an object in a vertical direction by adjusting a parallel axis of a mirror surface in a state in which a center of a mirror is fixed. The oscillating mirror may include a cylindrical pillar cut in a diagonal direction, a mirror surface coated with a thin metal film on a diagonal surface of the cylindrical pillar to reflect a laser transceived in the laser scanner and be penetrated by an electromagnetic wave incident from an outside the laser scanner, and a supporter disposed at a lower end of the mirror surface and configured to support the mirror surface.

A thickness of the thin metal film coated on the mirror surface of the oscillating mirror may be determined based on a skin depth defined by using a conductivity and a permeability of a metal used for a coating and a frequency of a wave.

The thickness of the thin metal film may be determined to be greater than a skin depth defined based on a laser transceived in the laser scanner and less than a skin depth defined based on the electromagnetic wave incident from the outside the laser scanner.

An electromagnetic wave absorber may be disposed on a vertical plane of the cylindrical pillar in the oscillating mirror.

Additional aspects of embodiments will be set forth in part in the description which follows and, in part, will be apparent from the description, or may be learned by practice of the disclosure.

According to embodiments, a malfunctioning of a laser scanner due to an external electromagnetic wave may be prevented by using an oscillating mirror of which a mirror surface is coated with a thin metal film to reflect a transceived laser and be penetrated by an electromagnetic wave incident from outside the laser scanner.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
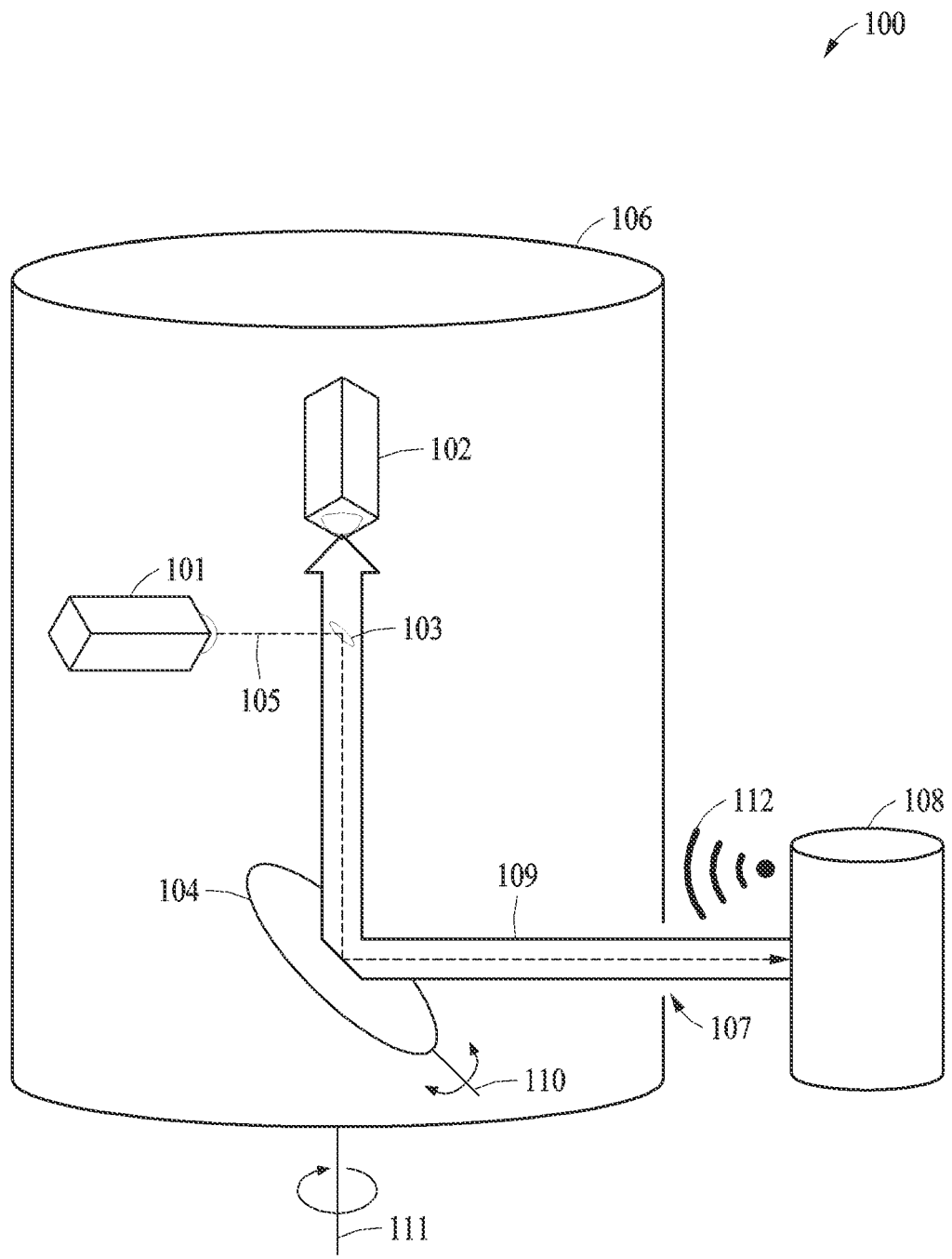
FIG. 1 is a diagram illustrating a structure of a laser scanner according to an embodiment.

The following detailed structural or functional description is provided as an example only and various alterations and modifications may be made to the embodiments. Here, embodiments are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like constituent elements and a repeated description related thereto will be omitted.

FIG. 1 is a diagram illustrating a structure of a laser scanner according to an embodiment.

Referring to FIG. 1, a laser scanner 100 may be configured with a laser transmitter 101, a laser receiver 102, a fixed mirror 103, and an oscillating mirror 104. The laser transmitter 101 may output transmission lasers 105 radiated towards an object 108, which will be scanned. The laser receiver 102 may receive reception lasers 109 which return after being reflected by the object 108. The fixed mirror 103 and the oscillating mirror 104 may change a traveling path of transception lasers transceived through the laser scanner 100.

More specifically, the transmission lasers 105 output from the laser transmitter 101 may be reflected by the fixed mirror 103, changing a traveling path of the transmission lasers 105 vertically to a disposition of the oscillating mirror 104. Thereafter, the transmission lasers 105 may be reflected by the oscillating mirror 104 and then be radiated to the object 108, which will be scanned, through an aperture 107 of a body 106 configuring the laser scanner 100.

Such transmission lasers 105 may be reflected by a surface of the object 108 and become the reception lasers 109, which travel back to the aperture 107 of the laser scanner 100. The reception lasers 109 may be scattered in the reflection process due to irregularities of the surface of the object 108, causing a beam width of the reception lasers 109 to widen more than that of the transmission lasers 105. Accordingly, a convex lens may be disposed in the aperture 107 of the body 106 of the laser scanner 100, and the disposed convex lens may help the laser receiver 102 to better receive the reception lasers 109 by concentrating the reception lasers 109 reflected by the surface of the object 108 and traveling back.

The reception lasers 109 received through the aperture 107 of the laser scanner 100 may be reflected again by the oscillating mirror 104, changing the traveling path vertically to the disposition of the fixed mirror 103 to be received by the laser receiver 102.

Thereafter, the laser scanner 100 may measure a distance to the surface of the object 108 by measuring a time difference between after the transmission lasers 105 are transmitted from the laser transmitter 101 and when the reception lasers 109 are received by the laser receiver 102. More specifically, the laser scanner 100 may calculate the distance to the surface of the object 108 by dividing the time difference of the measured transception lasers by a traveling speed of the transception lasers, that is, the traveling speed of light.

The oscillating mirror 104 may oscillate by repeatedly moving a parallel axis 110 of the mirror surface in a vertical direction while a center of the mirror is fixed and may control a traveling path of the transmission lasers 105 in a vertical direction through this. Therefore, the transmission lasers 105 may be sequentially reflected at a plurality of points in a vertical direction of the surface of the object 108, and then be received sequentially by the laser receiver 102 through the oscillating mirror 104 as reception lasers 109. The laser scanner 100 may sequentially calculate distances to the surface of the object 108 through the oscillating mirror 104 to scan a vertical plane form, that is, a two-dimensional (2D) form of the object 108.

In contrary, the body 106 of the laser scanner 100 may rotate in place around a vertical axis 111, causing the laser transmitter 101, the laser receiver 102, the fixed mirror 103, and the oscillating mirror 104 disposed in the body 106 to all rotate at the same time.

That is, the laser scanner 100 may scan the object 108 in a three-dimensional (3D) form by scanning a vertical plane of the object 108 through an oscillation of the oscillating mirror 104 and by scanning a horizontal plane of the object 108 through a rotation of the oscillating mirror 104.

Here, the oscillating mirror 104 of the present disclosure may prevent a malfunctioning of the laser scanner 100 due to an external electromagnetic wave by coating a mirror surface with a thin metal film to reflect a transceived laser and be penetrated by an electromagnetic wave 112 incident from outside the laser scanner 100. A detailed structure of the oscillating mirror 104 provided by the present disclosure is described through the diagrams below.

Figure 2:
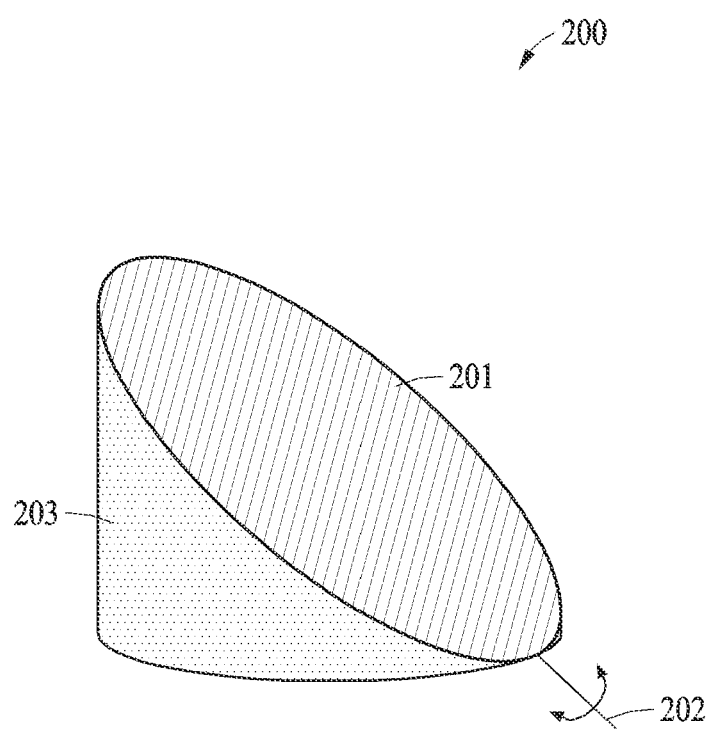
FIG. 2 is a diagram illustrating a perspective view of an oscillating mirror according to an embodiment.

FIG. 2 is a diagram illustrating a perspective view of an oscillating mirror according to an embodiment.

Referring to FIG. 2, a cylindrical pillar of an oscillating mirror 200 provided by the present disclosure may be cut in a diagonal direction, and then a mirror surface 201 may be formed on a diagonal surface of the cylindrical pillar. Here, the mirror surface 201 may be coated with a thin metal film such as gold, silver, or copper, capable of reflecting transception lasers. In an example of FIG. 2, the oscillating mirror 200 is implemented in a form of a cylindrical pillar. However, this is only an example and not limited thereto, and the oscillating mirror 200 may be implemented in various forms of pillars.

The oscillating mirror 200 may adjust a traveling path of transception lasers by adjusting an angle of the mirror surface 201 with respect to a horizontal plane. In addition, the oscillating mirror 200 may oscillate by repeatedly moving a parallel axis 202 of the mirror surface 201 in a vertical direction while a center of the mirror surface 201 is fixed. Accordingly, the oscillating mirror 200 of FIG. 2, same as the oscillating mirror 104 of FIG. 1, may provide a function capable of scanning a vertical plane form, that is, a 2D form of an object which will be scanned.

Referring to FIG. 2, an electromagnetic wave absorber 203 may disposed on a pillar surface of a cylindrical pillar of the oscillating mirror 200, which may absorb an electromagnetic wave incident from outside a laser scanner. The electromagnetic wave absorber 203 may be formed by applying a conductor or magnetic powder on a vertical plane of the pillar or by attaching a planar electromagnetic wave meta-material on the vertical plane of the pillar.

Figure 3:
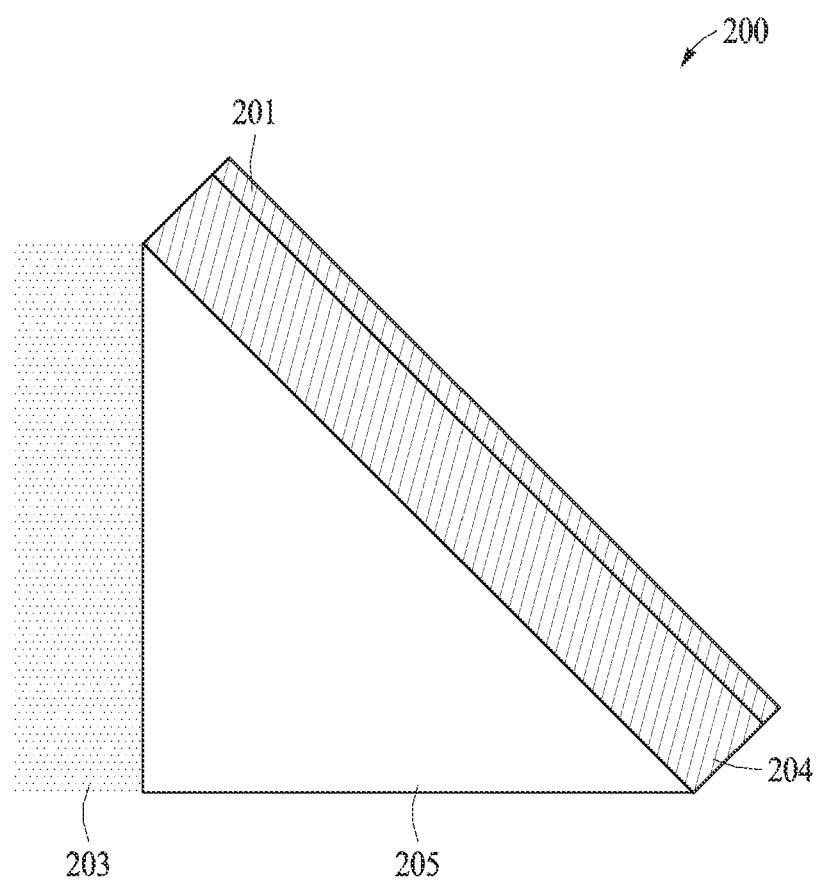
FIG. 3 is a diagram illustrating a vertical cross-section of an oscillating mirror according to an embodiment.

FIG. 3 is a diagram illustrating a vertical cross-section of an oscillating mirror according to an embodiment.

Referring to FIG. 3, a supporter 204 may be disposed at a lower end of the mirror surface 201 to support the mirror surface 201 formed with a thin metal film in an oscillating mirror 200. In addition, as described with reference to FIG. 2, the electromagnetic wave absorber 203 capable of absorbing an electromagnetic wave incident from outside a laser scanner may be disposed on a vertical plane of a cylindrical pillar, and an empty space of inside 205 of the oscillating mirror 200 may be filled with air.

Both transception lasers transceived through a laser scanner and an electromagnetic wave incident from outside the laser scanner may be included in a category of waves. When such a wave is incident on a metal surface, the wave undergoes reflection, penetration, and transmission. That is, partial wave energy may be reflected by the metal surface, and remaining energy may penetrate a metal layer forming the metal surface.

A wave may penetrate a metal layer as described above and undergo a skin effect until the wave is transmitted to a metal plane of an opposite surface. That is, wave energy may rapidly decrease in a form of an exponential function as the wave penetrates a metal layer. Due to such a rapid decrease of energy, high energy is distributed only at a portion right below a metal plane of the metal layer. Such a skin effect may be expressed as a physical quantity defined as a skin depth.

More specifically, a skin depth $\delta$ may be expressed as shown in Equation 1 below, by using a conductivity $\sigma$ and a permeability $\mu$ of a metal configuring a metal layer and a frequency f of a wave.

$$\delta = \frac{1}{\sqrt{\pi f \mu \sigma}} \quad \text{[Equation 1]}$$

A wave penetrating a metal layer is known to decrease in size in the form of an exponential function having a natural log e, that is, 'e' as the bottom, and '$(-1/\delta) \times depth$' as an exponent. This is because the wave penetrating the metal layer, that is, a laser or an electromagnetic wave, generates a surface current inside the metal layer and the surface current is converted to thermal energy proportional to the conductivity of the metal layer while flowing through the metal layer. Therefore, as the wave penetrates deeper from a surface of the metal layer, the energy rapidly decreases and dissipates, and remaining energy except for the entire dissipated energy passes through the metal layer.

Since the energy of the wave rapidly decreases as the wave penetrates the metal layer, the thicker the metal layer, the smaller the energy of the wave passing through the metal layer after penetrating the metal layer. For example, if a thickness of the metal layer is $3\delta$, the energy of the wave penetrating the metal layer may decrease to $e^{\wedge}(-3\delta \cdot 1/\delta) \cong 0.05$, that is, 5% of an energy size measured at a surface of the metal layer, at a depth of $3\delta$. Accordingly, most of the wave energy penetrating the metal layer dissipates as thermal energy in the metal layer, so the wave energy passing through the metal layer may be very small.

In contrary, when a thickness of a metal layer is less than a skin depth $\delta$, the decrease of wave energy penetrating the metal layer may be small. For example, when the thickness of the metal layer is $\delta/10$, the wave energy penetrating the metal layer may decrease to $e^{\wedge}[-(\delta/10)\cdot(1/\delta)]=0.9$, that is, 90% of the energy size measured at a surface of the metal layer, at a depth of $\delta/10$. Therefore, only a portion of the energy of the wave penetrating the metal layer may dissipate as thermal energy and most of the wave energy may pass through the metal layer.

Accordingly, a thickness of the mirror surface 201 may be determined to reflect transception lasers and be penetrated by an electromagnetic wave incident from the outside a laser scanner by using such a skin effect, in the oscillating mirror 200 provided by the present disclosure.

The skin depth $\delta$ may be determined by a frequency of the wave penetrating the metal layer, as shown in Equation 1 above. Therefore, the thickness of the mirror surface 201 may be determined in a way that the thickness of a thin metal film is determined to be greater than the skin depth $\delta$ in a frequency of transception lasers and the thickness of a thin metal film is thinner than the skin depth $\delta$ in a frequency of external electromagnetic waves, which causes a malfunctioning of a laser scanner, in the oscillating mirror 200.

Figure 4:
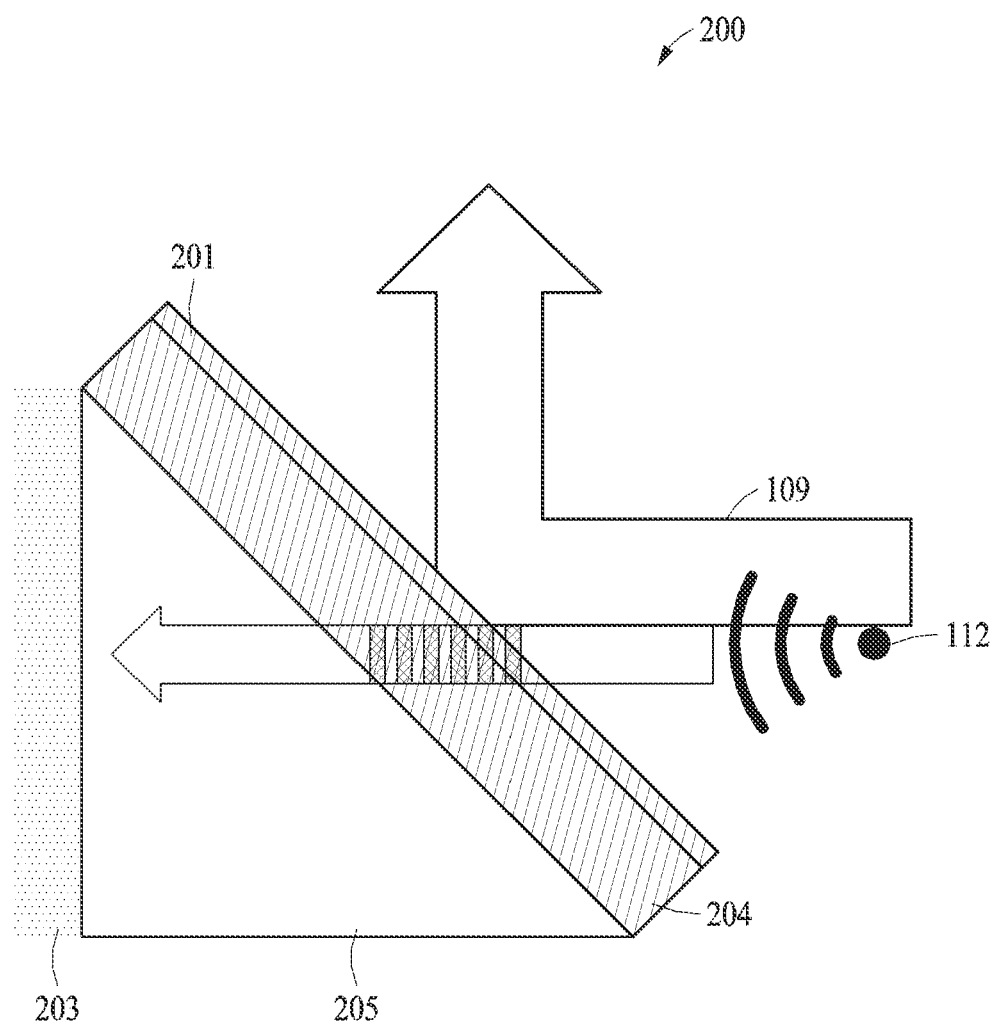
FIG. 4 is a diagram illustrating a movement path of a wave identified on a mirror surface according to an embodiment.

FIG. 4 is a diagram illustrating a movement path of a wave identified on a mirror surface according to an embodiment.

In an example, assuming that a laser scanner uses transception lasers having a wavelength of 850 nanometers (nm), the 850 nm wavelength corresponds to a frequency of 352 Terahertz (THz). Here, assuming that a material of a thin metal film is gold, a conductivity σ is $4.4 \times 10^7$ S/m. Using Equation 1, a skin depth $\delta_{Laser}$ corresponding to transception lasers having the 352 THz frequency is about 4 nm.

In contrary, the maximum frequency used in mobile communication services is 28 GHz, which is used in 5G services. Similarly, using Equation 1, $\delta_{EM}$ corresponding to an electromagnetic wave having the 28 GHz frequency is about 440 nm.

If a thickness of the mirror surface 201 is determined as $3\delta_{Laser}$, that is, 12 nm, based on the $\delta_{Laser}$, the 12 nm thickness of the mirror surface 201 may correspond to about 0.03 $\delta_{EM}$, compared to the skin depth $\delta_{EM}$ of the electromagnetic wave having the 28 GHz frequency.

Since the thickness of the mirror surface 201 determined as above is very thick compared to the skin depth $\delta_{Laser}$, the reception lasers 109 reflected by an object and returning may be reflected by the oscillating mirror 200 and be received by a laser receiver.

In contrast, the thickness of the mirror surface 201 provided in FIG. 4 is very thin compared to the skin depth $\delta_{EM}$, so the electromagnetic wave 112 incident from the outside a laser scanner may pass through the mirror surface 201.

The oscillating mirror 200 provided in the present disclosure may be designed to have low permittivity and be thin so that the electromagnetic wave 112 passing through the mirror surface 201 is not reflected by the supporter 204 as above. Finally, the electromagnetic wave 112, which sequentially penetrates the mirror surface 201 and the supporter 204, may penetrate the inside 205 of the oscillating mirror 200 and then be incident on the electromagnetic wave absorber 203 to dissipate.

That is, the oscillating mirror 200 may prevent a malfunctioning of a laser scanner due to an external electromagnetic wave by coating the mirror surface 201 with a thin metal film to reflect a transceived laser and be penetrated by the electromagnetic wave 112 incident from outside the laser scanner.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

Embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described embodiment, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A laser scanner comprising:
   a laser transmitter configured to output a laser radiated towards an object;

a laser receiver configured to receive a laser reflected from the object; and an oscillating mirror of which a mirror surface is coated with a thin metal film to reflect the received laser reflected from the object and be penetrated by an electromagnetic wave incident from an outside the laser scanner, wherein the received laser reflected from the object is reflected by the mirror surface of the oscillating mirror coated with the thin metal film and received by a laser receiver, and the electromagnetic wave incident from the outside the laser scanner penetrates the mirror surface of the oscillating mirror and then dissipates.

2. The laser scanner of claim 1, wherein a thickness of the thin metal film coated on the mirror surface of the oscillating mirror is determined based on a skin depth defined by using a conductivity and a permeability of a metal used for a coating and a frequency of a wave.

3. The laser scanner of claim 2, wherein the thickness of the thin metal film is determined to be greater than a skin depth defined based on a laser transceived in the laser scanner and less than a skin depth defined based on the electromagnetic wave incident from the outside the laser scanner.

4. The laser scanner of claim 1, wherein the mirror surface coated with the thin metal film is formed on a diagonal surface of a cylindrical pillar cut in a diagonal direction and a supporter is disposed at a lower end of the mirror surface and configured to support the mirror surface coated with the thin metal film, in the oscillating mirror.

5. The laser scanner of claim 4, wherein an electromagnetic wave absorber is disposed on a vertical plane of the cylindrical pillar in the oscillating mirror.

6. A laser scanner comprising:

an oscillating mirror configured to enable a scanning of an object in a vertical direction by adjusting a parallel axis of a mirror surface in a state in which a center of a mirror is fixed, wherein the oscillating mirror comprises:

a cylindrical pillar cut in a diagonal direction;

a mirror surface coated with a thin metal film on a diagonal surface of the cylindrical pillar to reflect a laser transceived in the laser scanner and be penetrated by an electromagnetic wave incident from an outside the laser scanner; and a supporter disposed at a lower end of the mirror surface and configured to support the mirror surface.

7. The laser scanner of claim 6, wherein a thickness of the thin metal film coated on the mirror surface of the oscillating mirror is determined based on a skin depth defined by using a conductivity and a permeability of a metal used for a coating and a frequency of a wave.

8. The laser scanner of claim 7, wherein the thickness of the thin metal film is determined to be greater than a skin depth defined based on a laser transceived in the laser scanner and less than a skin depth defined based on the electromagnetic wave incident from the outside the laser scanner.

9. The laser scanner of claim 6, wherein an electromagnetic wave absorber is disposed on a vertical plane of the cylindrical pillar in the oscillating mirror.

* * * * *